(12) United States Patent
Halloran

(10) Patent No.: US 6,860,068 B2
(45) Date of Patent: Mar. 1, 2005

(54) POTENTIAL ENERGY STORAGE SYSTEM

(76) Inventor: John J. Halloran, 52 Whisper Dr., Worcester, MA (US) 01609

( * ) Notice: Subject to any disclaimer, the term of this patent is extended or adjusted under 35 U.S.C. 154(b) by 171 days.

(21) Appl. No.: 09/891,879

(22) Filed: Jun. 26, 2001

(65) Prior Publication Data

US 2002/0194847 A1 Dec. 26, 2002

(51) Int. Cl.[7] .............................. B66B 9/04; E04B 1/98; E04H 9/02
(52) U.S. Cl. ........................... 52/1; 52/167.6; 52/173.1; 52/741.1; 52/750; 290/1 R
(58) Field of Search ........................ 52/1, 167.1, 167.4, 52/167.5, 167.6, 173.1, 741.1, 750; 290/1 R, 1 C; 60/325, 413

(56) References Cited

U.S. PATENT DOCUMENTS

| | | | |
|---|---|---|---|
| 3,396,944 A | * | 8/1968 | Jansz |
| 3,512,072 A | | 5/1970 | Karazija et al. |
| 3,939,356 A | | 2/1976 | Loane |
| 4,217,077 A | | 8/1980 | Brear |
| 4,275,989 A | | 6/1981 | Gutierrez Atencio |
| 4,310,769 A | | 1/1982 | Mazzone et al. |
| 4,351,415 A | | 9/1982 | Kita |
| 4,426,846 A | | 1/1984 | Bailey |
| 4,443,707 A | | 4/1984 | Scieri et al. |
| 4,454,865 A | * | 6/1984 | Tammen |
| 4,496,282 A | * | 1/1985 | Gokhman |
| 4,514,977 A | * | 5/1985 | Bowen |
| 4,587,773 A | * | 5/1986 | Valencia |
| 4,589,821 A | | 5/1986 | Rondot et al. |
| 4,956,947 A | * | 9/1990 | Middleton |
| 5,636,713 A | | 6/1997 | Perkins et al. |
| 5,839,239 A | * | 11/1998 | Jang |
| 5,970,665 A | * | 10/1999 | Oudman |
| 6,023,105 A | | 2/2000 | Youssef |
| 6,051,892 A | | 4/2000 | Toal, Sr. |
| 2003/0006612 A1 | * | 1/2003 | Halloran |

FOREIGN PATENT DOCUMENTS

| | | | |
|---|---|---|---|
| DE | 3104549 A1 | 9/1982 | |
| EP | 0829445 A1 | 3/1998 | |
| GB | 2341209 A | 3/2000 | |
| JP | 5-256046 | * 10/1993 | ................ 52/167.1 |

* cited by examiner

*Primary Examiner*—Robert Canfield
(74) *Attorney, Agent, or Firm*—Bowditch & Dewey, LLP

(57) ABSTRACT

The present invention relates to a system for generating electrical power using hydraulic supports on which a building structure is mounted. A pump injects fluid into the supports to raise the building structure and thereby store energy in the elevated structure. A valve can be opened to deliver fluid under pressure to a turbine to generate electricity.

18 Claims, 3 Drawing Sheets

POTENTIAL ENERGY STORAGE SYSTEM

BACKGROUND OF THE INVENTION

Existing methods of electrical power generation used to provide alternative or backup power sources to established energy grid systems have various difficulties associated with them. These existing systems are often expensive, inefficient, have a limited lifetime and/or generation capacity.

A continuing need exists for improvements in power generation, particularly to offset electrical power demands during peak loads.

SUMMARY OF THE INVENTION

The present invention relates to a power conversion system that supplies electrical power to buildings or other facilities. The system can be used to meet the load demand for a designated building during the daily peak load hours. In a preferred embodiment, the system can be located in the basement of the building, and includes a plurality of hydraulic support chambers arranged vertically below the building support columns and mounted on the foundation. Each chamber is fitted with an inlet pipe and an outlet pipe at its bottom which is connected to a main header which acts to equalize the level or pressure of the fluid medium within the system. The header connects to a reversible pump/turbine unit which generates electricity when the fluid is allowed to discharge from the hydraulic support chambers, through the hydraulic turbine generator and into an atmospheric fluid reservoir.

In off-peak hours, when external electrical energy is less expensive and in larger supply or if an internal storage battery system source is available, the generator is operated as a motor which runs the turbine as a pump. In this mode of operation, the fluid is drawn from the reservoir and pumped into the header system which delivers fluid at equal pressure to all the hydraulic support chambers. Slip sealed pressure plates accordingly rise in elevation carrying the bearing pads, vertical connecting links, and the entire building support steel structure with them. The new elevation of the building and its weight thus provide potential energy on demand via the pressurized fluid which again can be fed to the inlet of the turbine generator.

An external "Limited-Displacement Lateral Restraint System" can be included to maintain vertical stability, as well as minimize or limit relative lateral movement of the building in relation to its foundation, especially during any seismic disturbances. The restraint system as well as other system components can be controlled by a computer or system controller programmed to provide automatic operation to optimize efficiency and power generation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
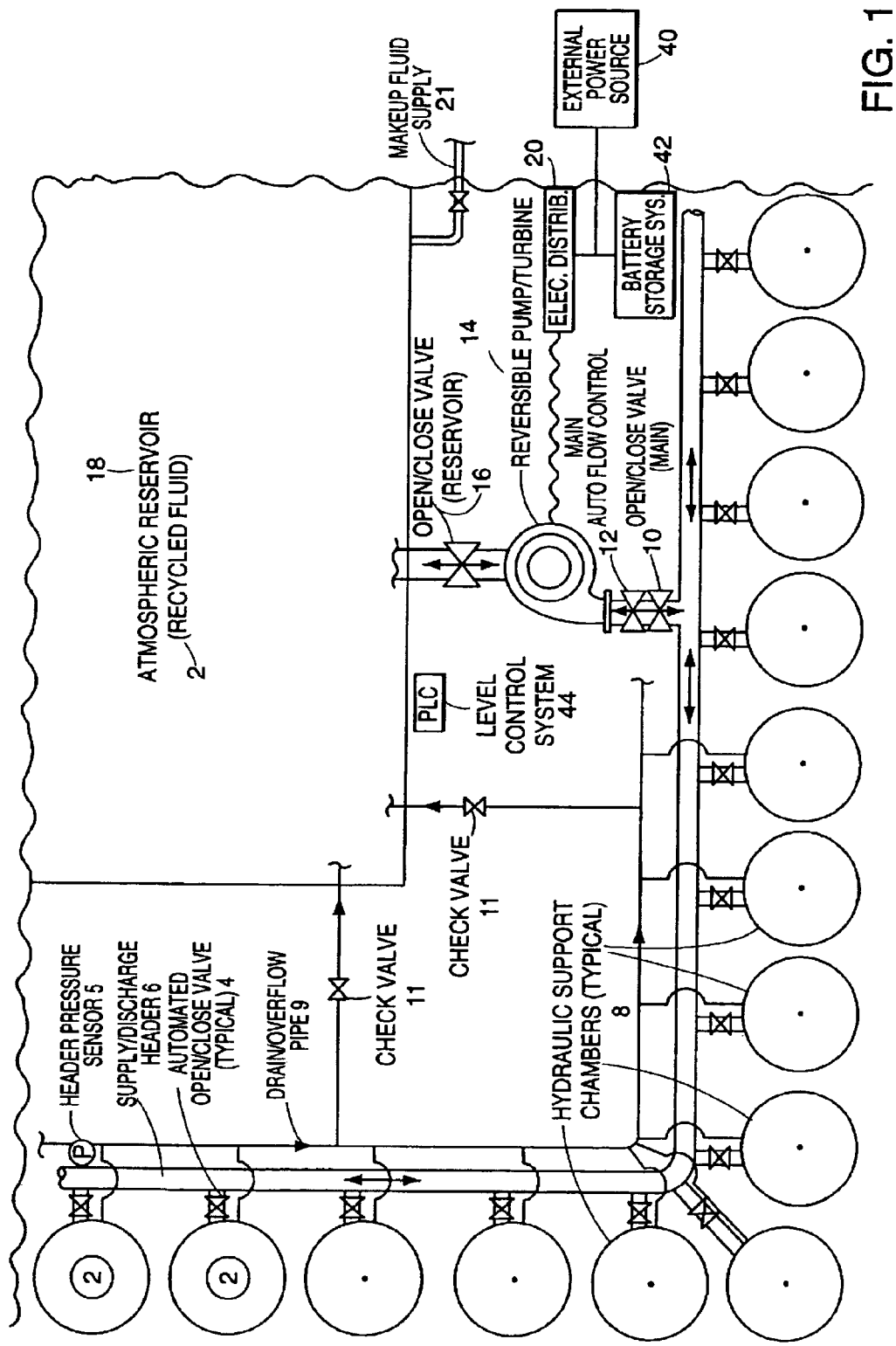
FIG. 1 is a plan view at building incorporating a preferred embodiment of the invention.

Various public utilities have used the "pumped storage" system which elevates large volumes of water several hundreds of feet to an upper reservoir, during off-peak hours when electrical power supplies are more available and less expensive. This stored energy, in the form of the potential energy of the elevated water, is then available on demand during peak periods. When required, the water is released, fed through large penstocks, into the inlet side of a large water-wheel-type turbine which is connected to a generator to produce electrical power. The prime-mover system used for this application is a reversible pump and turbine system which allows the generator to be run as a motor to drive the turbine in the reverse direction, thus operating as a pump to return the water again to the upper reservoir from the lower reservoir at the turbine discharge.

The current electric power market is focused on the need for addressing shortages of generation supply during peak-demand hours. New "distributed power" (e.g., small generators) has advantages such as capacity close to the demand load centers, reduction of load on main transmission and distribution lines by installation of more small generators closer to the load centers which are typically urban and suburban areas, and reduced emissions from fossil-fueled plants.

Prior systems for pumped storage hydroelectric generation have been based upon an upper and lower reservoir of water with the height difference being the key to creating the pressure head at the inlet to the turbine. Thus a practical system requires hundreds of feet of "head," as well as large volumes of water in order to generate power throughout the peak hours of a typical day. These requirements and the structures required to support the system are not practical for small plants distributed throughout urban and other densely settled areas.

The present invention involves generation of electric power within dedicated building structures. Since the size and weight of buildings is quite often proportional to their electricity supply needs, the weight of the building structure is utilized to create the equivalent "head" of several hundreds of feet at the inlet of an hydraulic turbine. Also, all the hydraulic fluid (typically water) required is located within a plurality of hydraulic support chambers and the atmospheric reservoir at the basement level of the building. Thus, the basic "pumped storage" hydroelectric concept can be employed without moving large volumes of water to large heights. This is accomplished by allowing the building structure itself to rise and fall, typically in a range of 10–20 feet, during the pumping and generation cycles.

The present invention does not limit itself to windmill power, nuclear power or even its own captive storage battery system for its power source during the pumping part of the cycle. However, depending on the local supply and demand situation during the "off-peak" hours, the probability of "green" power being available (as opposed to fossil-fuel power) for pumping will be higher than during peak demand periods.

An added benefit of the present invention is its foundation design which is inherently earthquake resistant. Thus, a potential energy storage system is a desirable structural approach for new buildings in areas in which there is a shortage of electric generating capacity and there is a risk for seismic activity.

A preferred embodiment of the present invention is illustrated generally in FIG. 1. Recycled hydraulic fluid 2 discharges from the hydraulic chambers 8 through the automated chamber valves 4 into the supply and discharge header 6 which transports the fluid through the main valve 10 and into the main automatic flow control valve 12. This automatic valve regulates fluid flow to the reversible pump/turbine 14 according to the electrical demand from the generator which is being driven by the hydraulic turbine. The turbine discharges the hydraulic fluid through reservoir valve 16 at the reservoir 18 where it is stored until the pumping cycle begins. During pumping the reversible pump/turbine unit 14 is rotated in the opposite direction, driven by the generator acting as a motor and driving the turbine as a pump. During this part of the cycle the fluid follows the same path from the reservoir 18 back to the hydraulic support chambers 8. The chambers 8 are in fluid communication with a drain or overflow pipe 9, which is connected to the reservoir 18 and a further fluid supply 21, if needed. The electrical distribution center 20 receives and distributes the power to the building during the generation cycle and delivers electrical power (from optional sources) to the motor during the pumping cycle. Distribution center 20 can be connected to an external power source 40 and a battery storage system 42.

Figure 2:
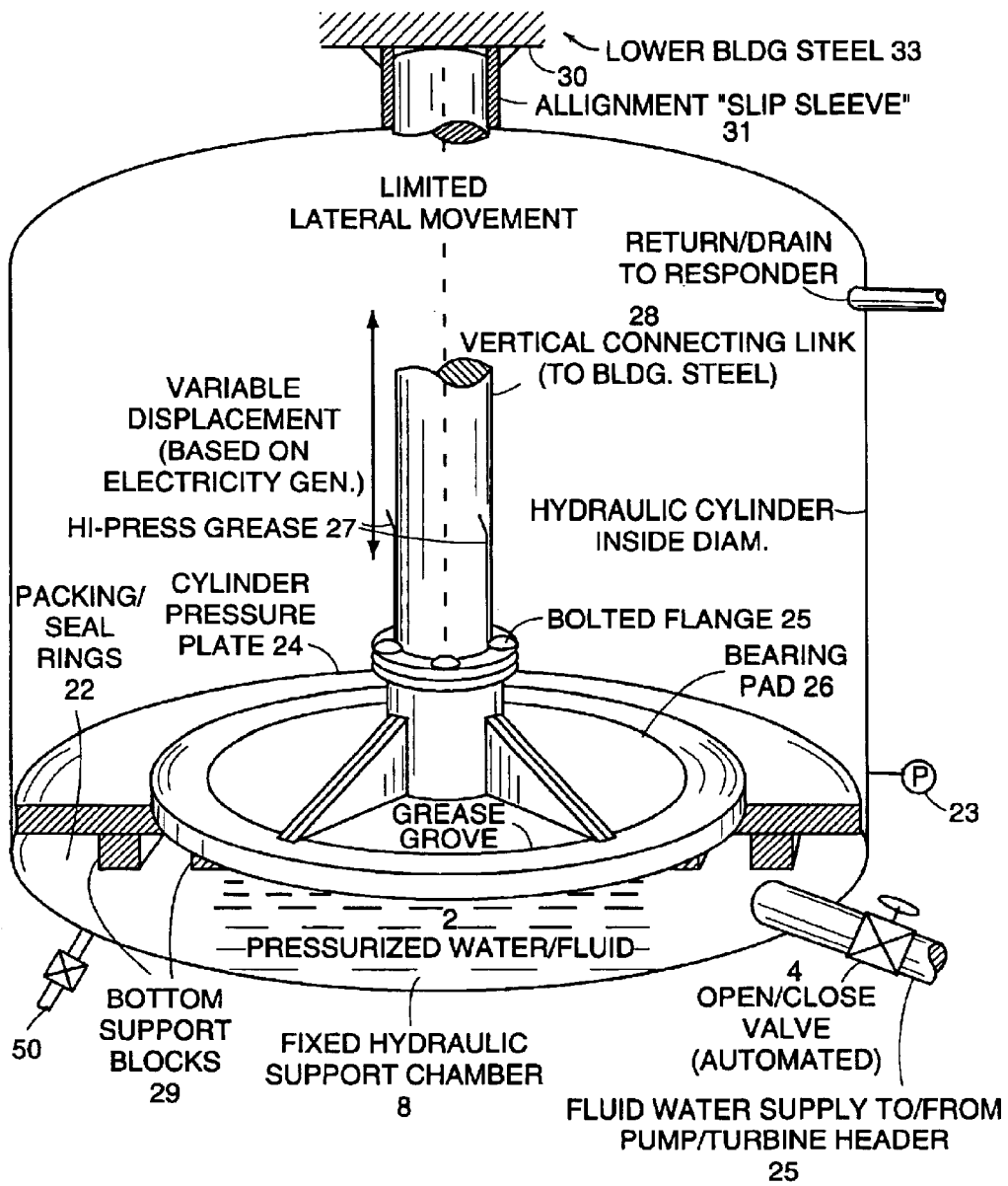
FIG. 2 is a cut-away view of a hydraulic support chamber in accordance with the invention.

FIG. 2 is a cut-away view of a typical hydraulic support chamber. During the pumping cycle the hydraulic fluid 2 enters at the bottom of the chamber through the conduit 25 and chamber valve 4 and pressurizes the chamber volume below the pressure plate 24 which is sealed to the internal walls of the chamber by packing seal rings 22. As the pressure builds up, the pressure plate 24 rises thereby lifting off the blocks 29 on the chamber floor, carrying the bearing pad 26 and the vertical connecting link 28. Since all the connecting links 28 rise equally due to the equal pressures supplied by the supply and discharge header 6, the entire building structure 30 rises evenly according to the pressure and volume delivered by the fluid pump 14. Each connecting link 28 can be coupled to steel 33 of building 30 with an alignment sleeve 31. A bypass line 50 can also connect the chamber to drain line 9 with a normally closed automated valve.

Figure 3:
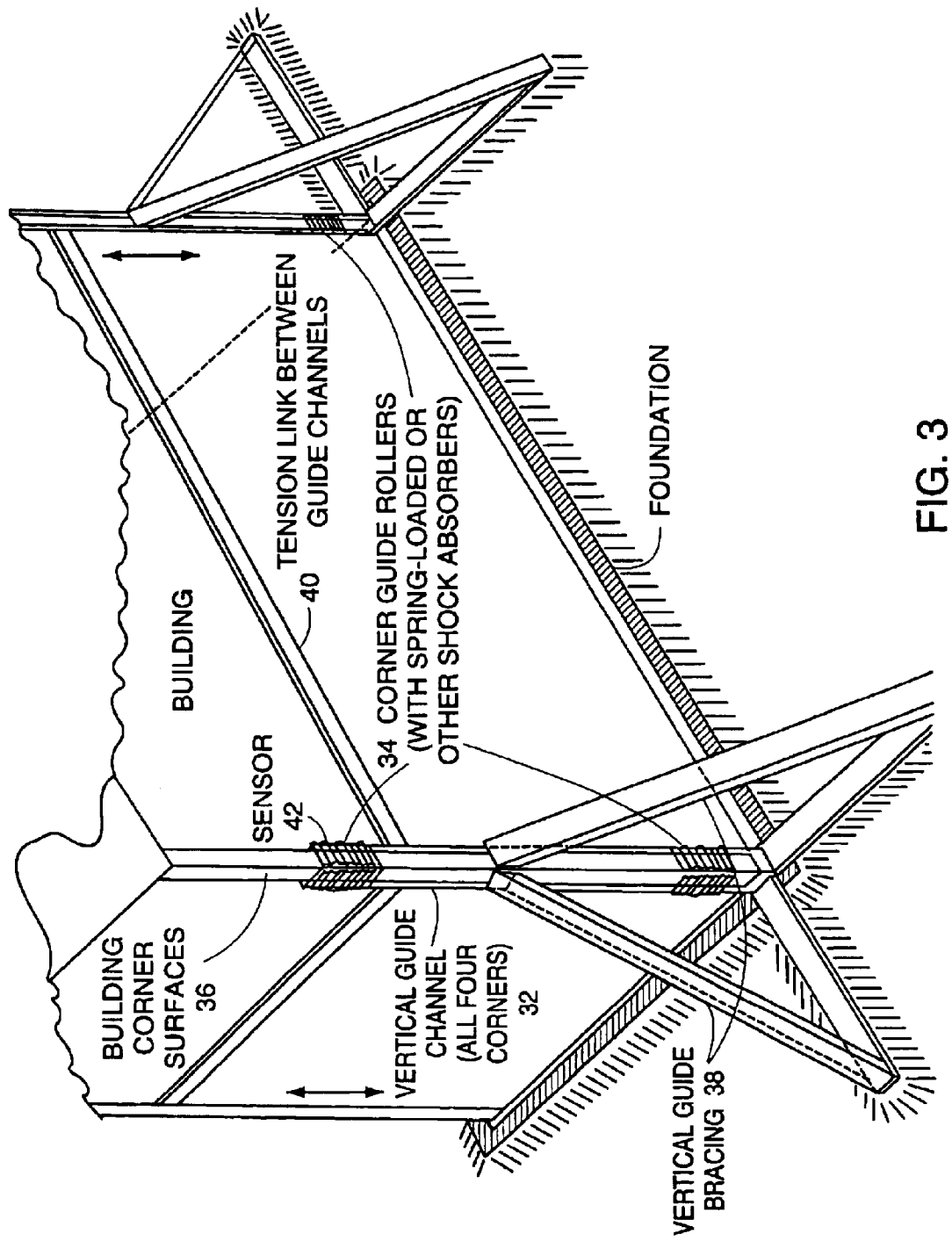
FIG. 3 illustrates in partial perspective view a limited displacement lateral restraint system used in accordance with the invention.

FIG. 3 shows a side elevation of a typical limited displacement lateral restraint system. The key components of this system are the vertical guide channels 32 which hold at least two sets of guide roller assemblies 34 which are adjusted to ride on the outer external corner surfaces of the building structure 36. The roller assemblies 34 are equipped with spring-loaded mounts to allow for some preset horizontal displacement while still maintaining the vertical and level orientation of the building. The rigidity of the vertical guide channels is maintained through appropriate bracing 38 and tension links 40 between corners. Each corner guide is equipped with an electronic proximity or position sensor 42 which detects any vertical displacement differences between corners.

The potential energy system includes a PLC-based (programmable logic controller)-based level control system 44 to maintain the horizontal (level) orientation of the building within pre-set limits. This system receives input signals from the proximity sensors 42 at each corner of the building in order to detect differences in vertical position. If a pre-set difference allowance is exceeded the control system signals the appropriate automated chamber valves 4 to close or "throttle" in order to create a pressure imbalance between certain chambers until the "out-of-level" condition is corrected. Fluid pressure levels inside the chambers are also input to the level control system via pressure sensors 23 and these signals are utilized to control the positioning of the automated chamber valves.

The pressure signals also allow the level control system to act as a safety system to isolate a specific chamber upon significant decrease in pressure level by fully closing the associated chamber automated valve. Likewise, the system can isolate all the chambers by closing their valves 4 upon any sudden decrease or low pressure indication from the supply/discharge header pressure sensor 5.

While this invention has been particularly shown and described with references to preferred embodiments thereof, it will be understood by those skilled in the art that various changes in form and details may be made therein without departing from the scope of the invention encompassed by the appended claims.

What is claimed is:

1. A building hydraulic power system comprising:
   a plurality of hydraulic support chambers;
   a conduit that supplies fluid to the hydraulic support chambers;
   a building foundation;
   a building support structure including support columns and walls;
   a connecting link carried by the hydraulic support chambers for supporting the building support structure and exerting pressure on the fluid;
   a turbine which generates electricity during a fluid discharge from the support chambers;
   a valve that controls hydraulic fluid flow to the turbine;
   a fluid reservoir to collect hydraulic fluid from a turbine discharge;
   a volume of fluid deliverable to the hydraulic support chambers such that the building support structure is raised relative to the building foundation; and
   an electrical distribution controller that distributes generated power.

2. The system of claim 1 further comprising:
   each of the plurality of hydraulic support chambers having a wall;
   a pressure plate carried by the chamber and interfacing with the wall of the chamber;
   a seal carried by the pressure plate to prevent hydraulic fluid leakage between the plate and the wall of the chamber;
   a bearing pad centrally positioned on the pressure plate;
   a high pressure lubricant supply to deliver lubricant to the bearing pad to allow relative movement between the bearing pad and the pressure plate; and
   a vertical guide channel having a roller assembly to allow elevation changes of the building support structure while maintaining vertical orientation of the building.

3. The system of claim 1 further comprising a pump to deliver fluid to the support chambers to elevate the building support structure.

4. The system of claim 1 further comprising a limited displacement lateral restraint system assembly coupled to the building to allow elevation changes of the building support structure while maintaining vertical orientation of the building.

5. The system of claim 1 wherein the turbine further comprises a pump.

6. The system of claim 1 further comprising a chamber valve that controls fluid flow between each support chamber and the conduit.

7. A support structure for a building having a structure and a foundation, the support structure accommodates seismic earth movements through an hydraulic cushion of building support chambers while providing controllable relative horizontal movement between the building support structure and the building foundation, the support structure comprising:

a plurality of hydraulic support chambers, each chamber having a wall;

each chamber having a pressure plate which moves vertically within each hydraulic support chamber and fixed in the horizontal position;

a plurality of bearing pads, each bearing over each pressure plate at each hydraulic support chamber;

vertical connecting links, each connecting link extending between the associated bearing pad and a steel structure of the building support structure;

a lubricant supply and distribution system to provide lubricant film between the bearing pads and a face of the pressure plates; and seals around each pressure plate to prevent hydraulic fluid leakage between the chamber walls and the pressure plates.

8. The structure of claim 7 further comprising:

an external limited displacement lateral restraint system to allow a controlled, relative horizontal movement between the building structure and a fixed foundation and allow vertical and level movement of the building structure relative to the foundation comprising:

vertical guide channels to maintain the vertical orientation of the building during vertical movements;

an adjustable guide roller assembly within the guide channels and with a shock absorbing mechanism to maintain contact with the outer vertical corner surfaces of the building steel structure while allowing horizontal displacement; and a bracing system to maintain orientation of the vertical guide channels relative to the building foundation during wind loads.

9. The structure of claim 7 further comprising:

a turbine which generates electricity during a fluid discharge from the support chamber;

a valve that controls hydraulic fluid flow to the turbine;

a system controller to control fluid flow to the chamber; and a battery storage system connected to the turbine.

10. The structure of claim 7 further comprising a valve connected to the support chamber to periodically control delivery of lubricant.

11. A method of generating power using controlled motion of a building comprising:

delivering fluid to a plurality of hydraulic support chambers to elevate a building support structure relative to a fixed building foundation;

lowering the building support structure and controlling delivery of fluid from the support chambers to a turbine which generates electricity; and operating an electrical distribution controller that distributes generated power from the turbine.

12. The method of claim 11 further comprising:

providing a pressure plate with a seal to prevent hydraulic fluid leakage between the plate and a wall of the chambers;

providing a bearing pad which is centrally positioned on the pressure plate;

delivering lubricant to the bearing pad to allow relative movement between the bearing pad and the pressure plate;

coupling an upward hydraulic force to a lower building support steel structure with a vertical connecting link; and providing a vertical guide channel having a roller assembly to allow elevation changes of the building while maintaining vertical orientation of the building.

13. The method of claim 11 further comprising pumping fluid to the support chambers with a pump.

14. The method of claim 11 further comprising providing a limited displacement lateral restraint system.

15. The method of claim 11 further comprising pumping fluid to the support chambers with the turbine.

16. The method of claim 11 further comprising providing a chamber valve that controls fluid flow between each support chamber and fluid delivery to a conduit coupled to a fluid reservoir.

17. The method of claim 14 further comprising:

providing an external limited displacement lateral restraint system to allow a controlled, relative horizontal movement between the building structure and the fixed foundation and allow vertical and level movement of the building structure relative to the foundation, the system having;

vertical guide channels to maintain the vertical orientation of the building during vertical movements;

an adjustable guide roller assembly within the guide channels and with a shock absorbing mechanism to maintain contact with the outer vertical corner surfaces of a building steel structure while allowing horizontal displacement; and a bracing system to maintain orientation of the vertical guide channels relative to the building foundation during wind loads.

18. The method of claim 11 further comprising providing a system controller and a battery storage system.

* * * * *